No. 780,267. Patented January 17, 1905.

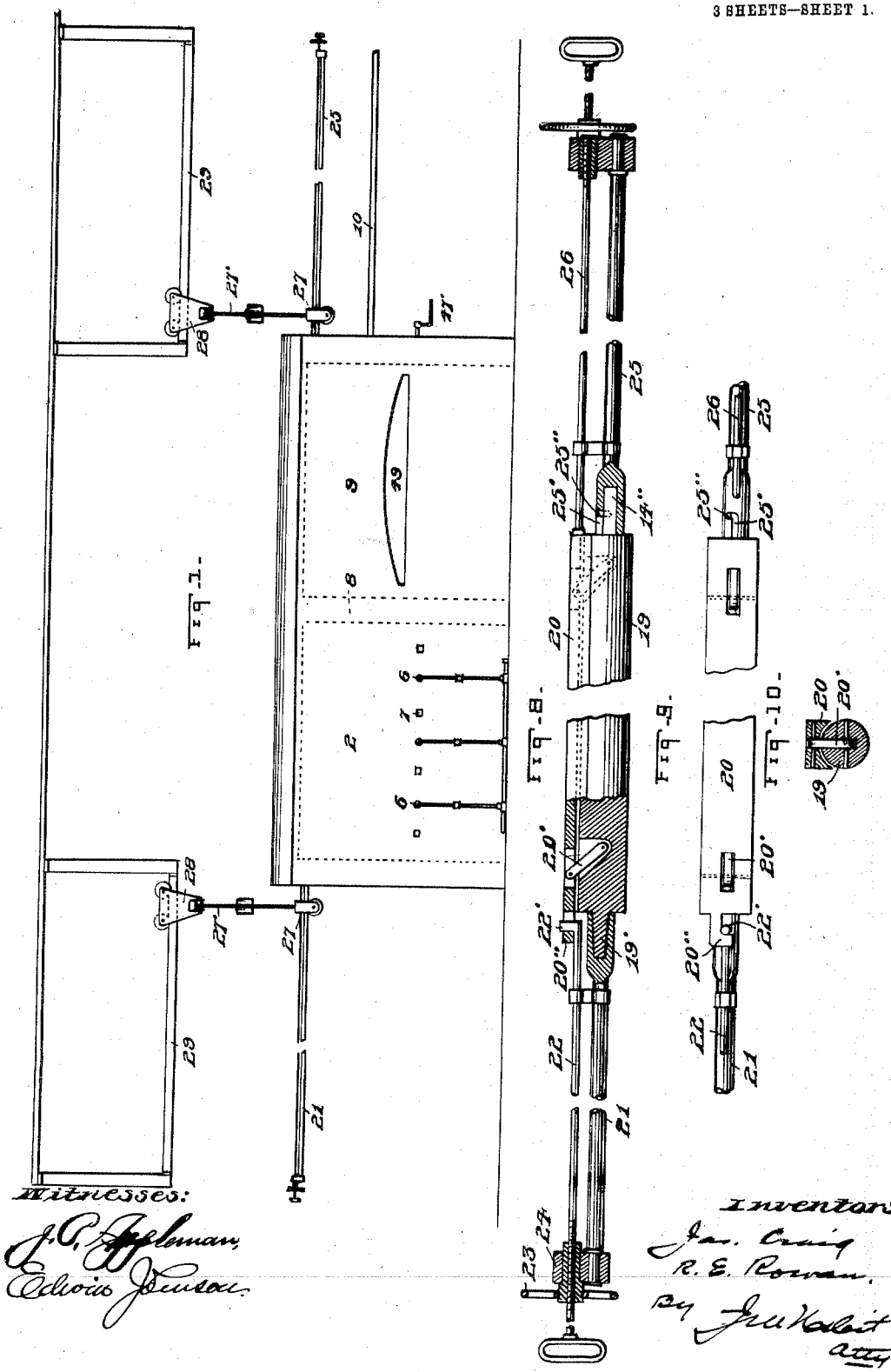

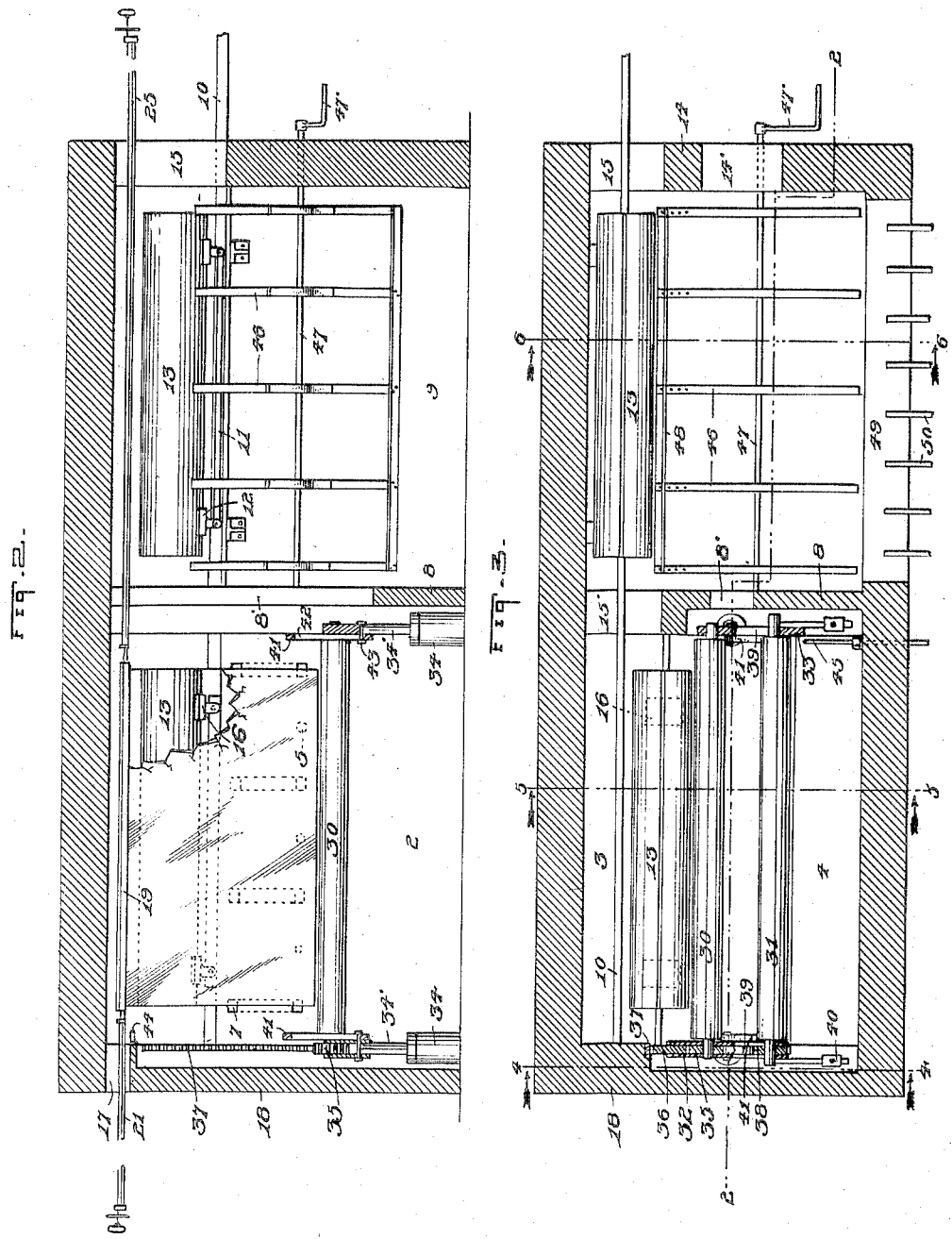

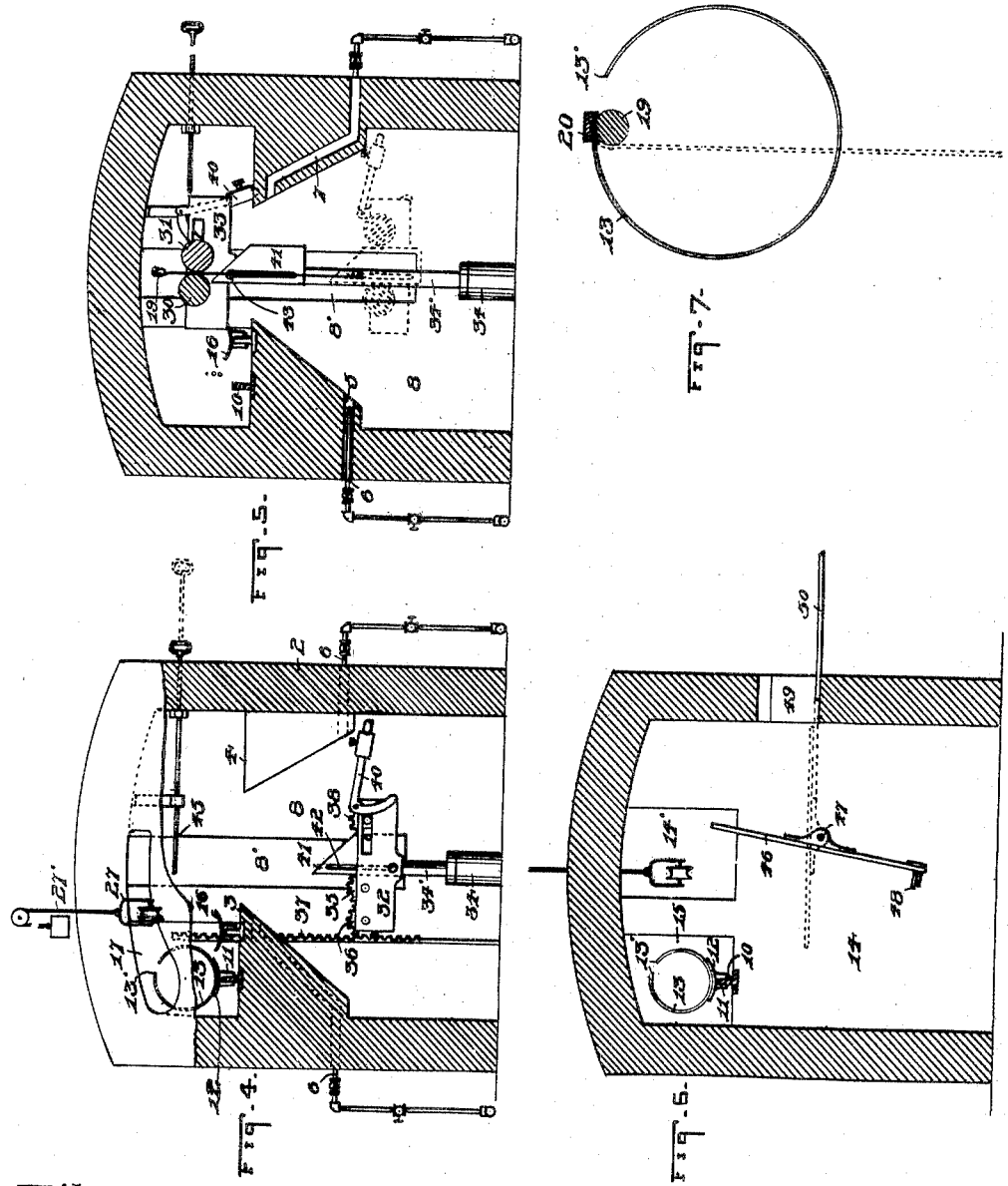

UNITED STATES PATENT OFFICE.

JAMES CRAIG AND ROBERT E. ROWAN, OF PARNASSUS, PENNSYLVANIA.

METHOD OF FLATTENING SHEET-GLASS.

SPECIFICATION forming part of Letters Patent No. 780,267, dated January 17, 1905.

Application filed October 17, 1903. Serial No. 177,371.

*To all whom it may concern:*

Be it known that we, JAMES CRAIG, a citizen of Great Britain, and ROBERT E. ROWAN, a citizen of the United States, residing at Parnassus, in the county of Westmoreland and State of Pennsylvania, have invented a certain new and useful Method of Flattening Sheet-Glass, of which the following is a specification, reference being had therein to the accompanying drawings.

This invention relates to a method of flattening curved sheet-glass, and has particular reference to the flattening of blown-glass rollers or cylinders into window and other sheet glass.

Under the present practice after the rollers or cylinders are blown they are capped off—that is, their closed ends are cracked off—and they are cracked or opened in a straight line from end to end, so that when heated in the flattening-oven they will open and flatten out, and as the movable flattening-stone or oven-bottom carries the sheets progressively past the several stations of the oven the sheets are operated upon by smoothing-tools in the hands of skilled flatteners in such manner that when they reach the oven-discharge for passage into the annealing-leer they are flat and their surfaces quite as free from irregularities as by such flattening process it is possible to make them. By this old method only the upper face of the glass is operated upon, the under face remaining flat upon the stone, with the result that in some instances the faces of the sheets are subjected to unequal temperatures. Furthermore, any irregularities in the stone or particles of foreign matter thereon make their impress in the glass, and the resulting flaws are the cause of considerable waste.

With our improved method, wherein we obviate the difficulties above noted, the glass is supported with both surfaces freely exposed in the successive temperatures incident to the flattening operation, and the surfaces of the flattened sheets are free from flaws. We accomplish this by taking the capped and longitudinally-cracked rollers and inserting them in an oven, wherein they are sustained by one longitudinal edge in suspended position and subjected to sufficient heat to cause them to uncurl and drop by gravity into the form of substantially flat sheets. The conditions may be such that the glass will thus flatten into commercial form; but as such conditions would probably be exceptional we provide for evening the sheets while thus suspended by subjecting their surfaces to the action of opposing rolls, which may be passed thereover a sufficient number of times to impart an absolutely perfect and even finish, also a gloss that is unobtainable by the old method of flattening. It is well known in the art that the glass in a blown roller or cylinder frequently varies in thickness, so that the finished sheet will be thinner or thicker at one point than at another. While in our method the rolling is not designed primarily to stretch the glass, yet the action is such that irregularities in thickness will be greatly reduced, while any abrupt protuberances will be entirely removed. After the sheets have been flattened and while still in vertical or upright position they are passed, preferably, into an intermediate or cooling chamber and are turned to horizontal position and received by the traveling rods of the leer, in which they receive the final annealing.

Our improved method of flattening produces a better quality of finished glass than heretofore obtainable, and it may be flattened more rapidly and at less cost, as much of the skilled labor heretofore necessary is done away with and the apparatus is less costly than the old style of flattening-oven.

Apparatus may be variously embodied for practicing our new method, a form of which is shown in the accompanying drawings, wherein—

Figure 1 is a side elevation of the same. Fig. 2 is a vertical longitudinal sectional view taken on line 2 2 of Fig. 3. Fig. 3 is a sectional plan view, the transfer-table being shown in horizontal position. Figs. 4, 5, and 6 are vertical cross-sectional views taken on lines 4 4, 5 5, and 6 6, respectively, of Fig. 3. Fig. 7 is a cross-sectional view of a glass-roller and device for suspending the same. Figs. 8, 9, and 10 are detail views of the glass clamping and manipulating devices.

Referring to the drawings, 2 designates a rectangular oven having the opposite inwardly-projecting ledges 3 and 4, with only sufficient room therebetween for passage of the roll mechanism presently to be described. One object of these ledges is to partially obstruct the upward flow of heat and maintain the upper and lower portions of the oven at an even temperature. A further object is to provide for so locating the heating-burners and flue-outlets as to obtain the best results in thus equalizing the temperature. The inner faces of the ledges are downwardly and backwardly inclined, and at the base thereof and opening through the oven side walls are ports 5 for gas-burners 6, and alternating therewith are the flue-ducts 7, which preferably extend upward through the ledges and open through the inclined faces thereof near their upper edges. These flues may connect with any desired form of stack or exhaust mechanism. (Not shown.) With these flue-outlets intermediate the top and bottom of the oven, rather than at the top, the heat is prevented from collecting at the top and making that portion hotter than the lower part. However, the flues may be so controlled as to vary the heat in different portions of the oven as conditions may require.

At one end of oven 2 and separated therefrom by partition 8 is the cooling and transfer chamber 9, and extending into and through the latter is track 10, upon which slides carriage 11, having rounded supports 12, adapted to sustain a glass-roller 13, end wall 14, having opening 15, and partition 8 having opening 15' of sufficient size to pass the roller-laden carriage. On ledge 3, at the inner side of track 10, is rest 16, upon which each roller is transferred preparatory to the flattening process. This transfer may be effected by a suitable tool (not shown) operated through opening 17 in end wall 18. Carriage 11 is then withdrawn for a fresh roller, which is thereupon inserted in chamber 9, where it receives a preliminary heating preparatory to passing to oven 2 and onto rest 16, upon which it is placed as soon as the preceding roller is removed for the flattening process.

The rollers or cylinders 13 are cracked longitudinally in the usual manner before being placed on carriage 11, and the slot thus formed presents two longitudinal edges 13'. During the pauses in chamber 9 and on rest 16 each roller becomes sufficiently heated to open slightly, so that the gripping device may be readily applied to one of said edges. This gripping device consists, preferably, of a cylindrical bar 19, having the curved clamping-plate 20 secured thereto by pivoted links 20', the arrangement being such that when plate 20 is moved longitudinally it will be drawn inward or toward bar 19, and thus securely clamp one of the roller edges 13'. Operative through end-wall opening 17 is the long manipulating-bar 21, having a socket at its inner end to receive projection 19' at the end of bar 19. Extending longitudinally over bar 21 is rod 22 with hook 22' at its inner end to turn into engagement with hooked end 20" of plate 20. The rod is threaded at its outer end and is operative through threaded wheel 23, mounted in bearing 24 at the outer extremity of bar 21. With bar 19 supported by its interlocking connection with bar 21 it is inserted in the roller 13, sustained on rest 16, and the edge of the glass is clamped in manner above described, clamping-plate 20 being drawn longitudinally to accomplish this by rod 22 and wheel 23. The roller is then lifted from rest 16 and sustained adjacent the furnace-crown above the space intermediate ledges 3 and 4. A bar 25, which is the counterpart of bar 21, save for bayonet-slot 25' in its inner or socket end, is operative through end-wall opening 14' and through chamber 9 and the vertical narrow opening 8' in partition 8 and unites with the opposite end extremity 19" of bar 19, said extremity having pin 25", which is engaged by the bayonet-slot 25', so that the bars are locked together, and in this position rod 26, corresponding to rod 22, is adjusted inward and caused to exert sufficient pressure on the extremity of plate 20 to hold the glass clamped without the aid of rod 22. The glass holding or suspending tool may be thus sustained at one or both ends during the flattening operation. Bars 21 and 25 may be conveniently supported and manipulated by means of roller-stirrups 27 on weighted lines 27', the latter being operative through trolley-carriages 28, mounted on overhead tracks 29. With these movable supports the operating-bars require very little lifting on the part of the operators. With the glass roller thus suspended in oven 2 it becomes more heated and gradually uncurls or straightens downward by force of gravity, and the conditions may be such that it will thus automatically assume a commercially flat form and require no further treatment. Not relying on this alone, we provide for subjecting the surfaces of the sheet while thus suspended to the action of opposing rolls, and our embodiment of this mechanism consists of the two rolls 30 and 31, journaled in heads 32 and 33, respectively, which are secured to piston-rods 34' of hydraulic or other lifts 34. In head 32 roll 30 is provided with pinion 35, which meshes with idler-pinion 36, and the latter meshes with fixed vertical rack 37. On the corresponding end of roll 31 is pinion 38, adapted to mesh with and be driven by pinion 35 when the rolls are close together in operative relation. Heads 32 and 33 are slotted at 39 to afford a sliding mounting for roll 31, with the angular and weighted levers 40 exerting constant pressure on roll 31 inward or toward roll 30, the levers being fulcrumed to and carried by the heads, as shown.

To hold the rolls separated so that the glass may straighten out in line with the space therebetween, the rolls being in lowered position, we provide the two plates 41, wedge-shaped at their upper ends and slotted vertically at 42 to slide on pins 43, projecting from heads 32 and 33. As the rolls approach their lowermost position they move downward over and are forced apart by plates 41, the downward movement of the latter having been stopped by coming in contact with the cylinders of lifts 34. The pressure of roll 31 holds the plates raised and the rolls separated until they rise to the upper portion of oven 2, when the plates strike stop 44 and bar 45, respectively, and their movement is arrested, while the further upward movement of the rolls permits roll 31 to move inward and oppose roll 30 with the glass plate therebetween. The rolls are then moved downward over the glass, the arrangement being such that they rotate and move downward at about the same speed, so that there will be no undue straining or stretching of the glass. The rolls remove all irregularities in the glass, and sufficient pressure is afforded by the weighted levers to eliminate any irregularities there may be in the thickness thereof. The rolling is preferably effected in a downward direction only, though the rolls may, if desired, remain active during their upward movement by reversing the direction of motion before plates 41 come in contact with cylinders 34. The rolls may be covered with asbestos or otherwise suitably surfaced to obtain the best results. Bar 45 is arranged to move laterally out of the way for the passage of the flattened sheet through partition-opening 8'.

After the sheet has been flattened in oven 2 it is drawn through opening 8' into chamber 9, the gripping device being supported by bar 25, bar 21 having been detached for connection with the gripping device of the next succeeding roller. The sheet is then placed on the vertically-swinging transfer-table 46, which is in inclined position to receive it, the table being mounted on shaft 47, provided with operating-crank 47'. On the inner or lower edge of the table is adjustable rest 48, so that the table may be arranged to receive sheets varying in width without excessive vertical movement of bar 25. With the sheet thus supported on the table rod 26 is retracted sufficiently to loosen clamping-plate 20 and bar 19, when the gripping device may be removed. Table 46 is then turned to horizontal position in line with leer-entrance 49, through which the traveling rods 50 of the leer reciprocate, moving to position beneath the plate, lifting the same from the table and carrying it forward into the leer. The table is then inclined ready to receive the next sheet. Several clamping-bars 19 may be in service at the same time, as operating-bar 21 and a clamping-bar may be removing a roller from rest 16 to suspended position in oven 2 before the clamping-bar used in the preceding operation has been released from its sheet.

From the time the glass rollers enter chamber 9 on the sliding carriage until they emerge therefrom in sheet form on the leer-rods both surfaces thereof are subjected to equal temperatures, and hence are of uniform temper throughout. Chamber 9 not only serves to heat the rollers in a preliminary way prior to their passage to oven 2, but also serves to cool and anneal the flattened sheets preparatory to entering the leer for the final annealing.

We claim as our invention—

1. The method of flattening glass, consisting in suspending the glass, heating the glass, and subjecting its surfaces while thus suspended to opposing pressures.

2. The method of flattening glass, consisting in suspending the glass, subjecting both surfaces of the glass to the same degree of heat, and subjecting its surfaces to opposing pressures.

3. The method of flattening glass, consisting in suspending the glass, heating the glass, and rolling the glass while suspended.

4. The method of flattening glass, consisting in suspending the glass, heating the glass, and subjecting the surfaces of the glass while suspended to the action of opposing rolls.

5. The method of flattening longitudinally-cracked glass cylinders, consisting in suspending the glass by one of the edges formed by the crack, heating the glass, and subjecting the surfaces of the glass while suspended to the action of opposing pressures.

6. The method of flattening glass which consists in holding heated curved glass suspended so that it may straighten by force of gravity, and then subjecting the glass to pressure.

7. The method of flattening glass which consists in holding heated curved glass suspended so that it may straighten by force of gravity and subjecting the glass to pressure after it has thus straightened and while still suspended.

8. The method of flattening curved sheet-glass consisting in suspending the glass, heating the same sufficiently to enable it to straighten, and rolling the glass.

9. The method of flattening curved sheet-glass consisting in suspending the glass, heating the same sufficiently to enable it to straighten, and rolling the surfaces of the glass while thus suspended and heated.

In testimony whereof we affix our signatures in presence of two witnesses.

JAMES CRAIG.
ROBERT E. ROWAN.

Witnesses:
W. J. HOWARD,
F. B. CARSON.